June 4, 1957 R. E. VERO 2,794,557
LOADING AND UNLOADING MACHINE
Filed April 26, 1954 2 Sheets-Sheet 2
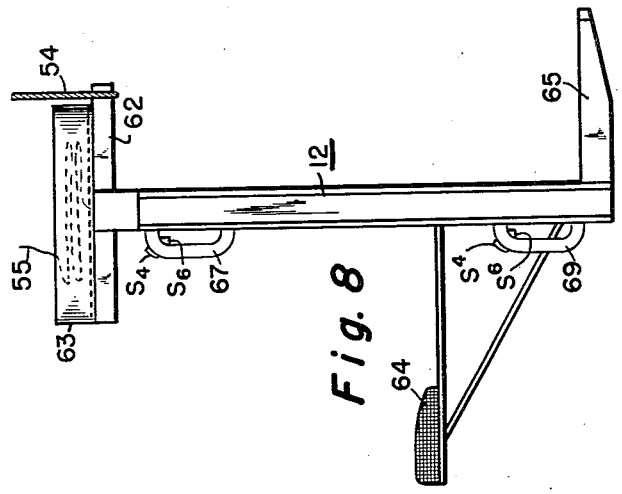
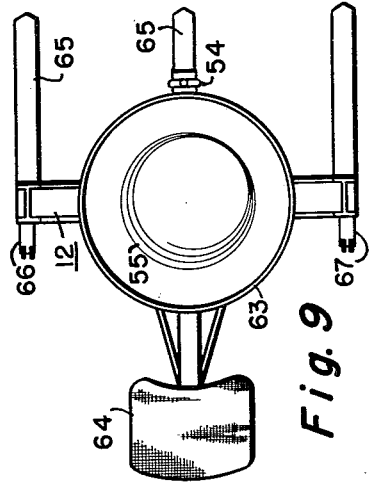
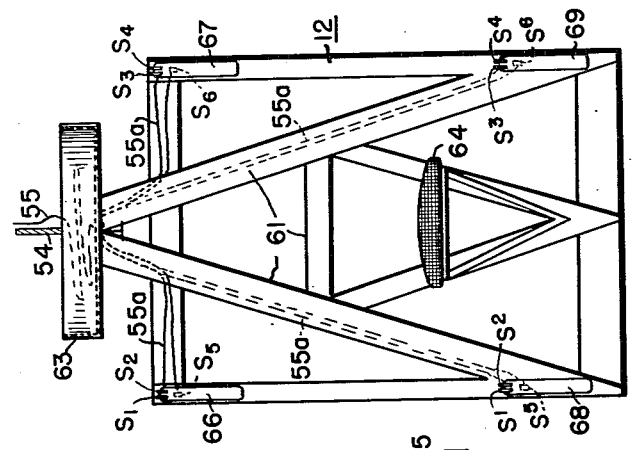
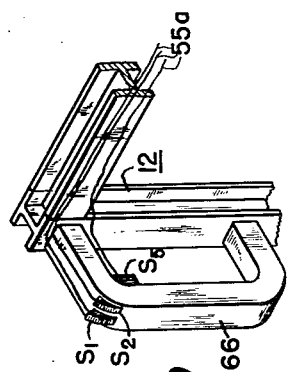
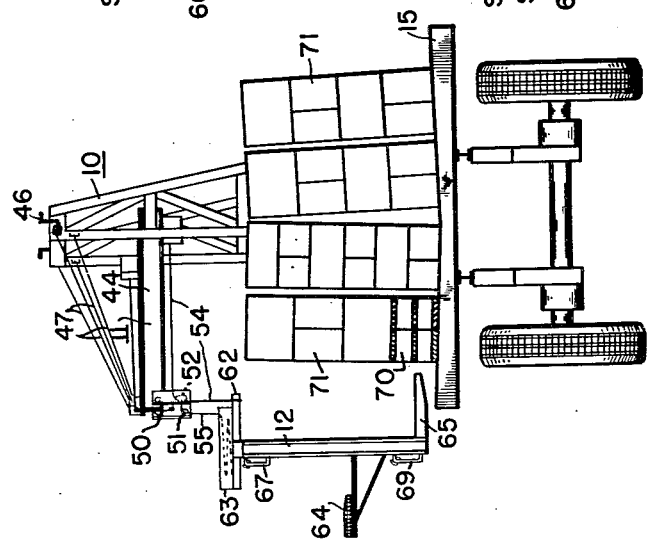
INVENTOR.
Robert E. Vero
BY
HIS ATTORNEYS

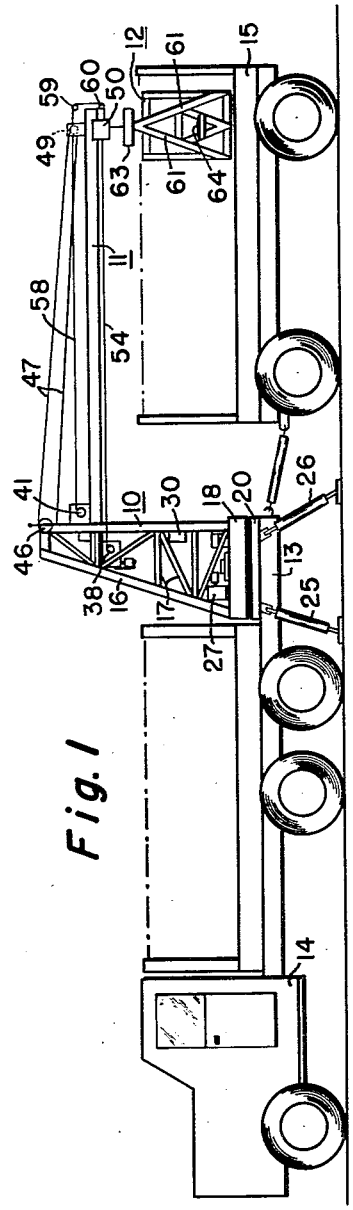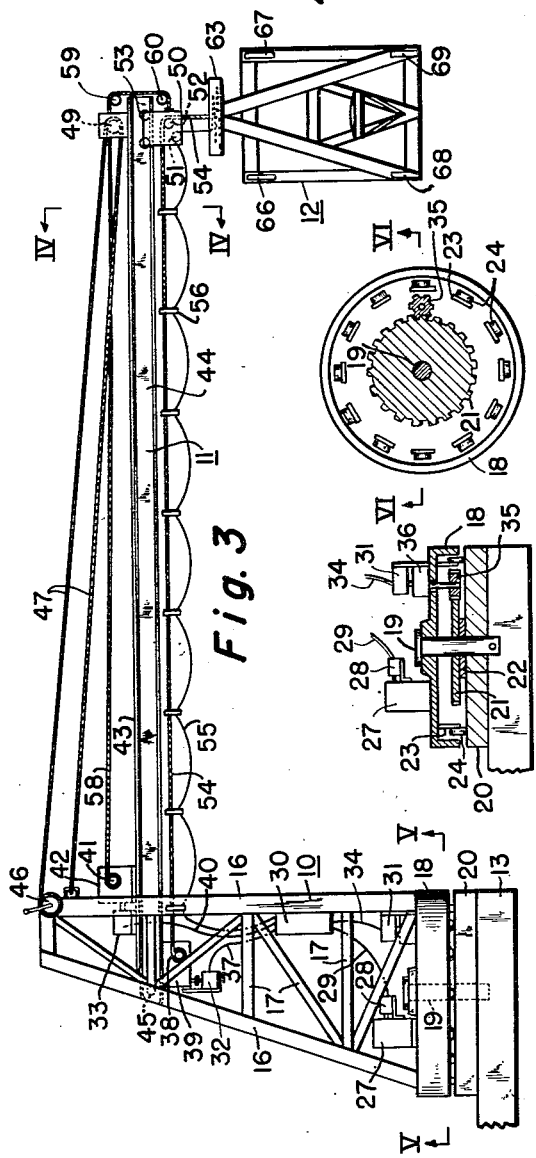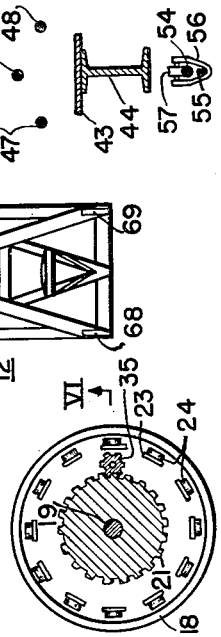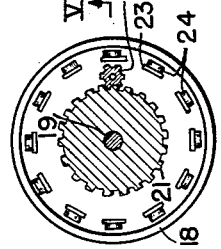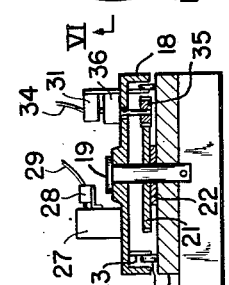

United States Patent Office 2,794,557
Patented June 4, 1957

2,794,557

LOADING AND UNLOADING MACHINE

Robert E. Vero, Glenshaw, Pa.

Application April 26, 1954, Serial No. 425,625

6 Claims. (Cl. 212—63)

This invention relates to a machine for transferring a load and, more particularly, to a machine requiring a single operator to load or unload a heavy building material, such as cinder blocks, from a carrier.

Various machines have been proposed to load cinder block, cement block, and the like on a truck and then to unload the truck at a point of use for the blocks. Usually such machines embody a boom supported by the truck and along which lifting apparatus may travel. Because of the great weight of the blocks, several precautions must be observed. It is customary, for example, to employ at least two operators to aid one another in transferring the heavy blocks and particularly in steadying the load as it is moved. Also prior machines have at best been only partially mechanically powered so that added manual power was needed to supplement that of the machine. Besides requiring additional labor, this has the more serious disadvantage in that it is not always possible to accurately control the positions of such parts as the boom. It sometimes happens that a free-swinging boom pivots away from the truck under the weight of its load, thereby causing the truck to tip over. This has resulted in serious accidents to operating personnel. This danger arises especially when unloading the truck while it is not substantially level, a situation very likely to occur at a building site where the blocks are being unloaded to be used in construction work. The danger of tipping may also be increased as blocks on the truck are unloaded, inasmuch as the center of gravity of the remaining blocks is therefore constantly shifting. Moreover, even if the balance and position of the truck are maintained, prior machines are limited in the extent to which blocks can be unloaded at a distance away from the truck. Usually prior unloading machines are capable of depositing blocks only at a point adjacent the truck.

My loading and unloading machine is free of these faults. The present machine is completely mechanically powered for all the moving parts. As a result, there is positive control of the position of the boom and accessory equipment at all times, and the danger of tipping is considerably diminished. My machine also includes a lifting frame which is adapted to accommodate the operator. The latter therefore is always close to the load and may quickly and accurately insure a safe engagement of the lifting frame with the load and then travel along with the load to its destination. By placing the controls for the entire machine on the lifting frame, only a single operator is needed, and he is able to control the entire operation of the machine from his vantage point on the frame.

In one form, my machine includes a mast having a boom. The boom carries a trolley which supports a lifting frame adapted to engage a load. Motors adjacent the boom rotate drums which pay out or draw in cables to effect the vertical movement of the frame with respect to the trolley and the horizontal travel of the trolley along the boom. The frame has a seat for an operator and also switches by which the operator actuates the motors. In the preferred embodiment, I realize complete control of the movement of the frame with respect to the trolley and the movement of the trolley with respect to the boom with only two motors.

The accompanying drawings illustrate a presently preferred embodiment wherein:

Figure 1 is a side view of a truck embodying my machine;

Figure 2 is a right-hand end view of Figure 1;

Figure 3 is an enlarged side view of the loading or unloading machine of Figure 1;

Figures 4 and 5 are sections of Figure 3 on the lines IV—IV and V—V, respectively;

Figure 6 is a section of Figure 5 on the line VI—VI;

Figures 7, 8, and 9 are front, side, and plan views, respectively, of the lifting frame of my machine; and Figure 10 is an enlarged, perspective view of one of the handles on the lifting frame.

Referring to the drawings, the machine includes a mast 10, a boom 11, and a lifting frame 12. The mast is mounted over an extension 13 of the chassis of a truck 14 having a trailer 15 both of which may be loaded with cinder blocks. The mast includes four corner posts 16 suitably reinforced by cross-arms and struts 17 and is carried on a turntable 18. The turntable is free to turn about a pin 19 fixed in a plate 20. Pin 19 has a gear 21 backed by a ring 22. Plate 18 has legs 23 carrying rollers 24 which ride over the plate 20. Telescoping support legs 25 and 26 steady the mast.

On top of plate 18 there is a gas engine 27 which drives a generator 28 to supply electrical energy through conductors 29 to a distribution box 30. This box contains a solenoid-operated reversing starter for each of three-phase, reversible motors 31, 32, and 33. Each motor is of the braking type by which the rotor is held stationary until an electrical current is impressed on the motor. Each reversing starter is tripped by switches on the frame 12 as later described. The reversing starter and the braking-type motor are not illustrated in the drawings since the construction and operation of this equipment are well understood by those skilled in the art. Motor 31 is energized through conductors 34 and has an output shaft extending through the turntable 18 to drive a pinion 35 through a gear reducer 36. The pinion engages the gear 21 and in this manner rotates the mast 10 about a vertical axis. Motor 32, supported below the boom 11 as shown, is energized by conductors 37 and rotates a drum 38 through a gear reducer 39, while motor 33, supported above the boom, is energized by conductors 40 and similarly rotates a drum 41 through gear reducer 42.

The boom 11 includes a plate 43 welded to an I-beam 44 which is pivoted at 45 to the mast 10. The angular position of the boom with respect to the mast may be adjusted by similar hand-operated winches 46 located on each side of the mast. One end of each of two cables 47 is fixed to the mast. The cables pass around similar pulleys 49 mounted on the plate 43 at the end of the boom and then wind around a winch 46. A trolley 50 has underslung pulleys 51 and 52 and rides the lower flanges of the I-beam 44 by wheels 53. A lifting cable 54 extends from the drum 38 over pulley 52 to the lifting frame 12 to which it is secured. Cable 54 carries a gathering 55 of, for example, nine conductors, three from each solenoid-operated reversing starter in box 30, by means of V-shaped hangers 56 (Figure 4). The gathering 55 may be fixed to the hangers at the crotch of the legs. A pulley 57 journalled in the legs of each holder rides the cable 54. At the trolley, the gathering 55 passes over pulley 51 and then down to the frame 12. As shown in Figure 3, there are just sufficient hangers 56 to support the gathering 55 along the length of the boom. When the trolley 50 moves to the left, the hangers are crowded closer together. Another cable 58 extends from drum 41 around pulleys 59 and 60 mounted on the end of the boom and then to the trolley 50 to which it is secured.

The frame 12 (Figures 7 through 10) is rectangular and suitably reinforced by angle irons 61. At the top, the frame has a rigid arm 62 to which cable 54 is secured and a tray 63 in which the gathering 55 of conductors coils or pays out, depending on the vertical direction of travel of the frame. An operator's seat 64 is supported away from the angle irons 61, and forks 65 project forwardly from the bottom of the frame to engage a load. At each corner of the frame there is a handle. Handles 66 and 67 form one set, and handles 68 and 69 form another. Each handle has three switches to which the necessary conductors $55a$ from the end of the gathering 55 are connected. For simplicity of illustration, the gathering 55 and conductors $55a$ have been shown in the drawings as single lines, it being understood that each may comprise as many conductors bound together as needed to effect the wiring and connection of switches and other parts as herein mentioned. Considering the top set, switches $S_1$ and $S_2$ of handle 66 are each connected in a different conductor of the set of three connected to the reversing starter for the three-phase motor 32. Switches $S_1$ and $S_2$, therefore, actuate motor 32 in opposite directions of rotation in a conventional manner, for example, by so tripping one of two solenoid-actuated starters in box 30 for motor 32 as to reverse the manner in which an electrical current is impressed across that motor. Switch $S_1$ causes motor 32 to rotate drum 38 so that the cable 54 is drawn in, while switch $S_2$ causes the motor to rotate drum 38 so that the cable is paid out. Switches $S_3$ and $S_4$ of handle 67 are also connected in the manner of switches $S_1$ and $S_2$ and similarly actuate motor 33. Switch $S_3$ causes the drum 41 to pay out the cable 58, and switch $S_4$ causes the drum to draw it in. Switches $S_5$ and $S_6$ on the handles 66 and 67, respectively, are also connected like switches $S_1$ and $S_2$ and actuate motor 31 in a like manner so that the mast 10 may be rotated about a vertical axis in either direction. The switches of the handle 68 and 69 are duplicates of the switches just described, and therefore have been given the same reference character except that the numeral has been expressed as an exponent instead of a subscript. This is meant to indicate that either switch having the same reference numeral associated with the letter S may be used to accomplish the same action. To this end, switches having a reference character including the same numeral, such as $S_1$ and $S^1$, may themselves be connected in parallel with respect to each other.

In use, the operator starts the engine 27 to furnish electrical energy as described. He then depresses either switch $S_5$ or $S_6$ to rotate the mast so that the boom is adjacent a point where he wises to engage the frame 12 with a load. It will be apparent that 360 degrees of revolution of the mast is possible. Instead of using switches $S_5$ or $S_6$, the operator could as well use switches $S^5$ or $S^6$, depending upon the relative vertical position of the frame with respect to himself. This selection is also true of all the subsequently described operations of the switches and represents an advantage of my machine in that the operator has a degree of freedom in moving around and away from the frame without sacrificing any control over the various moving parts.

Another important feature of my machine is that the forward and backward movement of the trolley along the boom and the upward and downward movement of the frame with respect to the trolley are all accomplished with only two motors. For example, if the trolley is to be moved toward the end of the boom, switches $S_2$ and $S_4$ are depressed. The brakes on motors 32 and 33 are automatically released, and motor 32 rotates drum 38 to pay out cable 54 while motor 33 rotates drum 41 to draw in cable 58. If the trolley is to be moved inwardly along the boom, switches $S_1$ and $S_3$ are used so that the motion of cables 54 and 58 is in the opposite direction. To vertically position the frame, the operator merely continues to use switches $S_1$ or $S_2$ and stop using switches $S_3$ and $S_4$. As the cable 54 is payed out or drawn in, the frame either descends or rises. The weight of the frame tensions cable 54 so that trolley 50 cannot move to the right as shown in Figure 3. On the other hand, restraining cable 58 prevents the trolley from moving to the left. At the same time that the frame descends or rises, the gathering 55 either pays out or coils in the tray 63.

When the frame is at the proper location the operator releases all switches and then stands aside the frame so as to move it at will by the handles 66 through 69. Assuming that the machine is being used for unloading, the forks 65 are inserted into openings 70 of the bottom cinder blocks of a row 71 as shown in Figure 2. In this instance, the operator may be walking alongside of the trailer 15 and using the lower handles 68 and 69. Inasmuch as the operator is close to the blocks, he can quickly and accurately insert the forks into the openings. Moreover, he can turn or pivot the frame as needed to insure a positive and safe engagement. If building materials having no openings are used, such as bricks, they can be baled and placed on pallets so as to be adapted for use with my machine. By mounting the switches on the handles as described, all these operations are most easily performed, the operator moving the frame by the handles and tripping the switches on the outside of the handle as needed by his thumbs, or the switches on the inside by his forefingers.

By using the switches in the manner described, the operator now moves the frame, trolley, and boom as desired to deposit the load on the ground beside the truck. Or the operator may sit in the seat 64 and carry the load to a point away from the truck where it is deposited. In this case, the operator travels along with the load and is in a position to neatly pile the blocks at a point of use by leaving his seat and maneuvering the frame as desired. This feature makes the present machine very useful in that blocks and the like may be unloaded from a truck and carried directly into an excavation many feet below the truck where the blocks may be neatly laid in a pile. At all times there is positive, power-driven control of all moving parts of the machine which not only prevents the boom from free-swinging out of control but enables heavier loads to be carried. To use the machine for loading, the operation as described is simply reversed.

While the foregoing disclosure describes a presently preferred embodiment, it is understood that the invention may be practiced in other forms within the scope of the following claims.

I claim:

1. A loading and unloading machine including a mast, a boom carried by the mast, a trolley mounted for travel along the boom, a pulley on the trolley, a lifting frame having forks adapted to engage and transfer a load, a seat for an operator carried by the frame, a drum stationed adjacent the boom, a cable extending from the drum to the trolley and fixed thereto, a second drum stationed adjacent the boom, a second cable extending from the second drum over the trolley pulley to the lifting frame and fixed thereto, means individually to rotate said drums in a desired direction whereby the cables may be selectively payed out or drawn in, means to pivot the mast about a vertical axis, and means solely on the frame to actuate the foregoing means whereby joint rotation of the drums in opposite directions moves the trolley along the boom and sole operation of the second drum moves the frame vertically with respect to the trolley and pivoting the mast places the boom in a desired direction so that the entire operation of the machine may be controlled by an operator from said seat.

2. A loading and unloading machine including a mast, a boom carried by the mast, a trolley mounted for travel along the boom, a pulley on the trolley, a lifting frame having forks adapted to engage and transfer a load, a seat for an operator carried by the frame, a drum stationed above the boom, a cable extending from the drum around an end of the boom to the trolley and fixed thereto, a second drum stationed below the boom, a second cable extending from the second drum over the trolley pulley to the lifting frame and fixed thereto, a reversible motor to rotate each drum whereby the cables may be selectively payed out or drawn in, a reversible motor to turn the mast about a vertical axis, means to power the motors, switches on the frame to actutae the motors, and conductors connecting the motors to the switches whereby joint rotation of the drums in opposite directions moves the trolley along the boom and sole operation of the second drum moves the frame vertically with respect to the trolley and whereby turning the mast about a vertical axis places the boom in a desired direction so that the entire operation of the machine may be controlled by an operator from said seat.

3. A machine as claimed in claim 2 wherein the frame has a handle adjacent each corner, said switches being stationed on each of said handles whereby the operator can simultaneously operate the switches and manually position the frame from each corner thereof.

4. A loading and unloading machine including a mast, a boom carried by the mast, a trolley mounted for travel along the boom, a pulley on the trolley, a lifting frame having forks adapted to engage and transfer a load, a seat for an operator carried by the frame, a drum stationed above the boom, a cable extending from the drum around an end of the boom to the pulley and fixed thereto, a second drum stationad below the boom, a second cable extending from the second drum over the trolley pulley to the lifting frame and fixed thereto, a reversible motor to rotate each drum whereby the cables may be additively payed out or drawn in, a reversible motor to turn the mast about a vertical axis, means to power the motors, switches on the frame to actuate the motors, conductors supported by the second cable connecting the motors to the switches, and a tray on the lifting frame to receive and pay out the conductors during vertical movement of the frame whereby joint rotation of the drums in opposite directions moves the trolley along the boom and sole operation of the second drum moves the frame vertically with respect to the trolley and pivoting the mast places the boom in a desired direction so that the entire operation of the machine may be controlled by an operator from said seat.

5. A loading and unloading machine including a mast, a boom carried by the mast, a trolley mounted for travel along the boom, a pulley on the trolley, a lifting frame having forks adapted to engage and transfer a load, a handle adjacent each corner of the frame, a seat for an operator carried by the frame, a drum stationed above the boom, a cable extending from the drum around an end of the boom to the pulley and fixed thereto, a second drum stationed below the boom, a second cable extending from the second drum over the trolley pulley to the lifting frame and fixed thereto, a reversible motor to rotate each drum whereby the cables may be selectively payed out or drawn in, a reversible motor to turn the mast about a vertical axis, means to power the motors, switches on said handles of the frame to actuate the motors whereby the operator can manually handle the frame while tripping the switches, conductors supported by the second cable connecting the motors to the switches, and a tray on the lifting frame to receive and pay out the conductors during vertical movement of the frame whereby joint rotation of the drums in opposite directions moves the trolley along the boom and sole operation of the second drum moves the frame vertically with respect to the trolley and pivoting the mast places the boom in a desired direction so that the entire operation of the machine may be controlled by an operator from said seat.

6. A machine as claimed in claim 2 wherein the frame is substantially rectangular and has a handle adjacent each corner, said switches being mounted in sets of three on each handle of the frame, the switches of each set controlling, respectively, the motors for the first and second drums and the mast whereby the operator can simultaneously operate said motors and manually position the frame from each corner thereof to provide a greater range of movement for the operator about the frame.

References Cited in the file of this patent

UNITED STATES PATENTS

| | | |
|---|---|---|
| 451,903 | Walsh | May 5, 1891 |
| 1,694,084 | Straight | Dec. 4, 1928 |
| 2,167,026 | Hatch | July 25, 1939 |
| 2,280,567 | Austin | Apr. 21, 1942 |
| 2,553,378 | Miller | May 15, 1951 |
| 2,646,180 | Schlough et al. | July 21, 1953 |
| 2,675,927 | Le Tourneau | Apr. 20, 1954 |